US011210023B2

(12) United States Patent
Tanriover et al.

(10) Patent No.: US 11,210,023 B2
(45) Date of Patent: Dec. 28, 2021

(54) TECHNOLOGIES FOR DATA MANAGEMENT IN VEHICLE-BASED COMPUTING PLATFORMS

(71) Applicant: Intel Corporation, Santa Clara, CA (US)

(72) Inventors: Cagri Tanriover, Bethany, OR (US); Vishakha Gupta, Portland, OR (US); Meghashree Dattatri Kedalagudde, Portland, OR (US); Hassnaa Moustafa, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/609,170

(22) PCT Filed: Jun. 30, 2017

(86) PCT No.: PCT/US2017/040301
§ 371 (c)(1),
(2) Date: Oct. 28, 2019

(87) PCT Pub. No.: WO2019/005108
PCT Pub. Date: Jan. 3, 2019

(65) Prior Publication Data
US 2020/0192603 A1 Jun. 18, 2020

(51) Int. Cl.
*G06F 3/06* (2006.01)
*G06N 20/00* (2019.01)
(Continued)

(52) U.S. Cl.
CPC .......... *G06F 3/0659* (2013.01); *G06F 3/0611* (2013.01); *G06F 3/0685* (2013.01);
(Continued)

(58) Field of Classification Search
CPC .... G06F 3/0611; G06F 3/0659; G06F 3/0685; G06F 9/466; G06F 13/1668;
(Continued)

(56) References Cited

U.S. PATENT DOCUMENTS 6,205,150 B1 * 3/2001 Ruszczyk ............. H04L 47/564
370/412
8,250,322 B2 * 8/2012 Huang ................ G06F 13/1626
711/158
(Continued)

FOREIGN PATENT DOCUMENTS

WO WO2016-164485 A1 10/2016

OTHER PUBLICATIONS

International Search Report and Written Opinion dated Mar. 23, 2018 for International Patent Application No. PCT/US2017/040301, 15 pages.
(Continued)

*Primary Examiner* — Eric T Oberly
(74) *Attorney, Agent, or Firm* — Schwabe, Williamson & Wyatt, P.C.

(57) ABSTRACT

Systems, apparatus, and computer-readable media for managing data storage for vehicle-embedded computer devices (VECDs) are disclosed. Embodiments include a data hierarchy, which classifies data based on the data source, data destination, the intended use of the data or a target application, data processing requirements of the data, and/or delivery time requirements of the data. A VECD may classified obtained data according to the hierarchy and may store the data in different storage devices based on the classification of data. Other embodiments are described and/or claimed.

25 Claims, 4 Drawing Sheets

(51) Int. Cl.
*G06F 9/46* (2006.01)
*G06F 13/16* (2006.01)
*G06F 13/42* (2006.01)
*G06N 5/02* (2006.01)

(52) U.S. Cl.
CPC .......... *G06F 9/466* (2013.01); *G06F 13/1668* (2013.01); *G06F 13/4282* (2013.01); *G06N 5/02* (2013.01); *G06N 20/00* (2019.01); *G06F 2213/0026* (2013.01); *G06F 2213/0032* (2013.01)

(58) Field of Classification Search
CPC ......... G06F 13/4282; G06F 2213/0026; G06F 2213/0032; G06N 5/02; G06N 20/00
See application file for complete search history.

(56) References Cited

U.S. PATENT DOCUMENTS

| | | | | |
|---|---|---|---|---|
| 8,918,586 | B1* | 12/2014 | Todd | G06F 16/13 |
| | | | | 711/117 |
| 8,949,276 | B1 | 2/2015 | Hunt | |
| 9,168,882 | B1* | 10/2015 | Mirza | B60R 16/037 |
| 9,489,635 | B1* | 11/2016 | Zhu | G06K 9/6263 |
| 9,760,306 | B1* | 9/2017 | Bigman | G06F 3/0605 |
| 10,990,881 | B1* | 4/2021 | Osmak | G06N 5/02 |
| 2004/0015249 | A1* | 1/2004 | Izumi | H04L 67/02 |
| | | | | 700/94 |
| 2006/0176901 | A1* | 8/2006 | Terai | G06Q 10/06 |
| | | | | 370/465 |
| 2008/0133088 | A1* | 6/2008 | Yamada | H04N 5/772 |
| | | | | 701/46 |
| 2008/0189660 | A1* | 8/2008 | Nakagawa | G06F 16/4393 |
| | | | | 715/840 |
| 2009/0082919 | A1* | 3/2009 | Hershey | F02D 41/249 |
| | | | | 701/33.4 |
| 2011/0078398 | A1* | 3/2011 | Jess | G06F 3/0689 |
| | | | | 711/162 |
| 2013/0151082 | A1 | 6/2013 | Preston | |
| 2014/0266684 | A1 | 9/2014 | Poder et al. | |
| 2015/0264713 | A1* | 9/2015 | Amemiya | H04W 74/04 |
| | | | | 370/336 |
| 2015/0351035 | A1* | 12/2015 | Lonnblad | H04W 52/0245 |
| | | | | 455/574 |
| 2016/0150047 | A1* | 5/2016 | O'Hare | G06F 3/0619 |
| | | | | 713/168 |
| 2019/0007490 | A1* | 1/2019 | Lindoff | H04L 67/2847 |

OTHER PUBLICATIONS

Jeong-Hoon Lee et al., "Towards intelligent in-vehicle sensor database management systems", Aug. 18, 2013, 17 pages, Multimedia Tools and Applications., vol. 74, No. 10.

Sherin Abdelhamid et al., "Vehicle as a Resource (VaaR)", Jan. 1, 2015, 6 pages, IEEE Network, IEEE Service Center, vol. 29, No. 1, New York, NY.

Hendrik Schweppe et al., "Flexible On-Board Stream Processing for Automotive Sensor Data", Feb. 1, 2010, 12 pages, IEEE Transactions on Industrial Informatics, vol. 6, No. 1, New York, NY.

Extended European Search Report dated Nov. 27, 2011 for European Patent Application No. 17916080.9, 7 pages.

* cited by examiner

TECHNOLOGIES FOR DATA MANAGEMENT IN VEHICLE-BASED COMPUTING PLATFORMS

CROSS REFERENCE TO RELATED APPLICATIONS

The present application is a national phase entry under 35 U.S.C. § 371 of International Application No. PCT/US2017/040301, filed Jun. 30, 2017, entitled "TECHNOLOGIES FOR DATA MANAGEMENT IN VEHICLE-BASED COMPUTING PLATFORMS", which designated, among the various States, the United States of America, the contents of which is hereby incorporated by reference in its entirety.

TECHNICAL FIELD

The present disclosure relates to the field of data storage systems and devices, and in particular, to apparatuses, methods, and storage media for managing data storage for vehicle-based computing platforms.

BACKGROUND

Many vehicle-embedded computer devices (VECDs), such as autonomous or semi-autonomous driving vehicle (hereinafter, simply ADV) systems, engine/electronic control units (ECUs), in-vehicle navigation systems, and the like, are network-enabled and may be connected with multiple vehicle-embedded sensors. For various vehicle-related services, VECDs may acquire relatively large quantities of data from, inter alia, other VECDs, mobile devices, network infrastructure, cloud computing service, etc. Such VECDs may are expected to generate, obtain, and process data in the order of tens of terabytes per day as a result of the numerous sensor data and information influx from vehicular cloud. Due to constraints on network usage and rapid response time expectations for certain applications (e.g., V2X, etc.), VECDs may be required to handle collected data locally. However, existing storage solutions for VECDs may not be capable of handling such large quantities of data.

Existing data management solutions mainly rely on compression algorithms and timestamps. However, these solutions tend to favor recently acquired data and may not be sufficient to store some data types, such as high quality video content. Existing hardware-based storage solutions include using solid state drives (SSDs) and/or persistent memories instead of hard disk drives (HDs). However, such solutions may still be too slow for some vehicle-based services, such as vehicle-to-infrastructure (V2I) services, vehicle-to-vehicle (V2V) services, sensor-based safety systems, autonomous driving, etc. Additionally, existing cloud-based solutions rely on cloud storage and cloud-based data processing with minimal use of local storage and processing. However, the round trip time may still be too slow for some vehicle-based services, such as V2I services, V2V services, sensor-based safety systems, autonomous driving, etc.

BRIEF DESCRIPTION OF THE DRAWINGS

The included drawings are for illustrative purposes and serve to provide examples of possible structures and operations for the disclosed embodiments. The drawings in no way limit any changes in form and detail that may be made by one skilled in the art without departing from the spirit and scope of the disclosed concepts.

DETAILED DESCRIPTION

Figure 1:
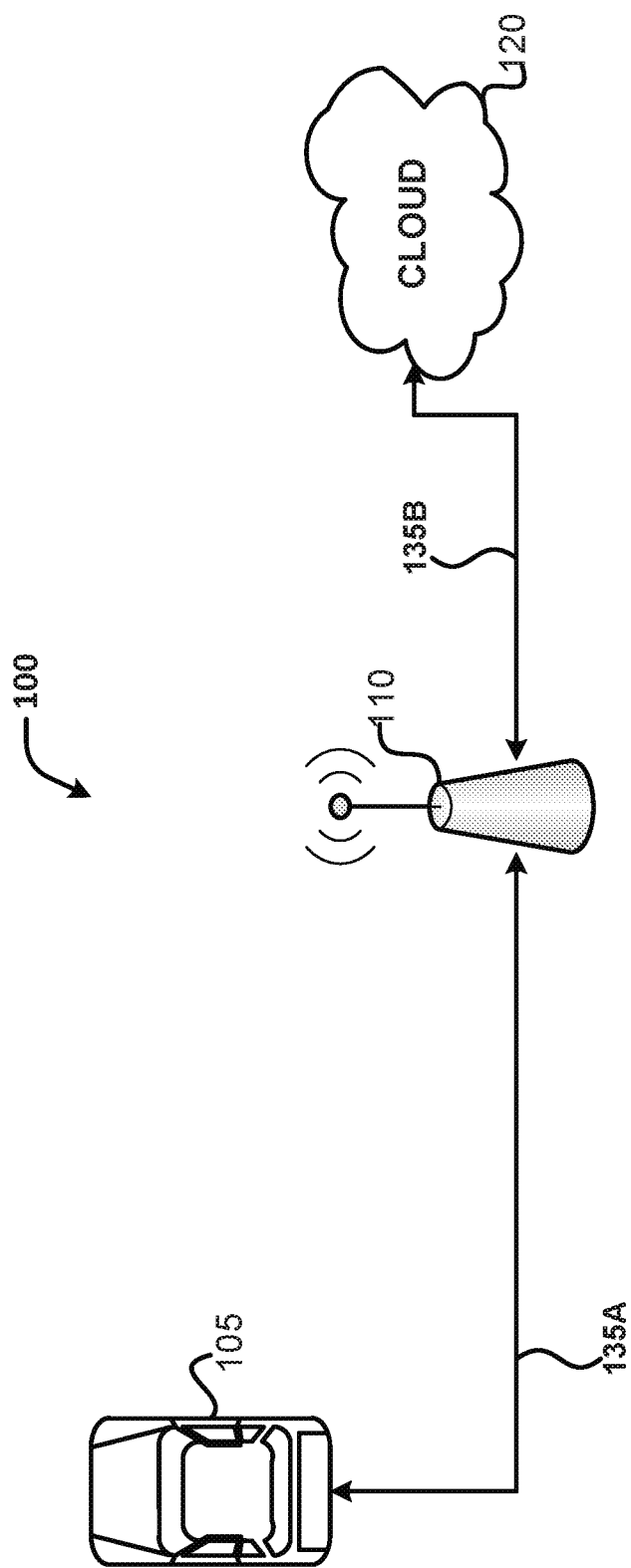
FIG. 1 illustrates an environment in which various embodiments may be practiced.

Disclosed embodiments are related to managing data storage for vehicle-embedded computer devices (VECDs), such as ADV systems, engine/electronic control units (ECUs), in-vehicle navigation systems, and the like. Many VECDs are network-enabled and may be connected with multiple vehicle-embedded sensors, which may cause VECDs to acquire relatively large quantities of data from, inter alia, other VECDs, mobile devices, network infrastructure, etc. Due to constraints on network usage and rapid response time expectations for certain applications or services (e.g., vehicle-to-everything (V2X), etc.), VECDs may be required to handle collected data locally. However, current storage solutions for VECDs may not be capable of handling such large quantities of data.

In order to solve such issues, embodiments include a data hierarchy, which classifies data based on the data source, data destination, the intended use of the data or a target application, data processing requirements of the data, and/or delivery time requirements of the data. In embodiments, a VECD may store the obtained data in different storage devices based on the classification of data. For example, sensitive data, data with a short lifetime, or buffered data may be stored in DRAM; entertainment data, navigation data, and sensor metadata may be stored in a first tier data store (e.g., 3D Xpoint or PCIe SSDs); low definition navigation data, vehicle settings data, vehicle maintenance history, sensor data dumps (e.g., sensor data not needed for driving) may be stored in a second tier data store (e.g., SATA SSD or hard disk drives); and road condition data, vehicle diagnostic data, etc. may be stored in a third tier data store (e.g., cloud storage).

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc., in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well-known devices, circuits, and methods are omitted so as not to obscure the description of the present invention with unnecessary detail.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in various embodiments," "in some embodiments," and the like are used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrases "A/B" and "A or B" mean (A), (B), or (A and B), similar to the phrase "A and/or B." For the purposes of the present disclosure, the phrase "at least one of A and B" means (A), (B), or (A and B). The description may use the phrases "in an embodiment," "in embodiments," "in some embodiments," and/or "in various embodiments," which may each refer to one or more of the same or different embodiments. Furthermore, the terms "comprising," "including," "having," and the like, as used with respect to embodiments of the present disclosure, are synonymous.

Example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

Example embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

As used herein, the term "circuitry" refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality.

As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

As used herein, the term "interface circuitry" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like).

As used herein, the term "computer device" may describe any physical hardware device capable of sequentially and automatically carrying out a sequence of arithmetic or logical operations, equipped to record/store data on a machine readable medium, and transmit and receive data from one or more other devices in a communications network. A computer device may be considered synonymous to, and may hereafter be occasionally referred to, as a computer, computing platform, computing device, etc. The term "computer system" may include any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources. Examples of "computer devices", "computer systems", etc. may include cellular phones or smart phones, feature phones, tablet personal computers, wearable computing devices, an autonomous sensors, laptop computers, desktop personal computers, video game consoles, digital media players, handheld messaging devices, personal data assistants, an electronic book readers, augmented reality devices, server computer devices (e.g., stand-alone, rack-mounted, blade, etc.), cloud computing services/systems, network elements, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or any other like electronic devices. Moreover, the term "vehicle-embedded computer device" may refer to any computer device and/or computer system physically mounted on, built in, or otherwise embedded in a vehicle.

As used herein, the term "network element" may be considered synonymous to and/or referred to as a networked computer, networking hardware, network equipment, router, switch, hub, bridge, radio network controller, radio access network device, gateway, server, and/or any other like device. The term "network element" may describe a physical computing device of a wired or wireless communication network and be configured to host a virtual machine. Furthermore, the term "network element" may describe equipment that provides radio baseband functions for data and/or voice connectivity between a network and one or more users. The term "network element" may be considered synonymous to and/or referred to as a "base station." As used herein, the term "base station" may be considered synonymous to and/or referred to as a node B, an enhanced or evolved node B (eNB), next generation nodeB (gNB), base transceiver station (BTS), access point (AP), roadside unit (RSU), etc., and may describe equipment that provides the radio baseband functions for data and/or voice connectivity between a network and one or more users. As used herein, the terms "vehicle-to-vehicle" and "V2V" may refer to any communication involving a vehicle as a source or destination of a message. Additionally, the terms "vehicle-to-vehicle" and "V2V" as used herein may also encompass or be equivalent to vehicle-to-infrastructure (V2I) communications, vehicle-to-network (V2N) communications, vehicle-to-pedestrian (V2P) communications, or V2X communications As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information.

Referring to the figures, FIG. 1 illustrates an environment 100 in which various embodiments may be practiced. Environment 100 includes a vehicle 105, a wireless access node 110, and a cloud computing service 120 (also referred to as "cloud 120", "the cloud 120", and the like). Vehicle 105 may be an ADV having a VECD incorporated with the hierarchical data storage technology of the present disclosure to locally manage a large volume of data. For illustrative purposes, the following description is provided deployment scenarios including an ADV 105 in a two dimensional (2D) freeway/highway/roadway environment. However, the embodiments described herein are also applicable to any type of vehicle, such as trucks, buses, motorcycles, boats or motorboats, and/or any other motorized devices capable of transporting people or goods, having data storage/management challenges. For example, water vehicles such as boats, ferries, barges, hovercrafts, etc., may interact and/or communications in a same or similar manner as ADVs 105 (e.g., using V2X circuitry and infrastructure), and such vehicles may also implement the data management, storage, and sharing techniques discussed herein, such as where such vehicles are relatively close to communications infrastructure (e.g., located on piers and/or land) or other water-based vehicles. The embodiments described herein may also be applicable to three dimensional (3D) deployment scenarios where the ADV 105 is implemented as flying objects, such as aircraft, drones, unmanned aerial vehicles (UAVs), and/or to any other like motorized devices. Moreover, although the following description discusses vehicle related scenarios, the embodiments discussed herein may also be applicable to any type of computer device or data storage systems/devices.

The ADV 105 may be any type of motorized vehicle or device used for transportation of people or goods, which may be equipped with controls used for driving, parking, passenger comfort and/or safety, etc. The terms "motor", "motorized", etc. as used herein may refer to devices that convert one form of energy into mechanical energy, and may include internal combustion engines (ICE), compression combustion engines (CCE), electric motors, and hybrids (e.g., including an ICE/CCE and electric motor(s)). Although FIG. 1 shows only a single ADV 105, the ADV 105 may represent a plurality of individual motor vehicles of varying makes, models, trim, etc., which may be collectively referred to herein as "vehicle 105" or "ADV 105."

Figure 3:
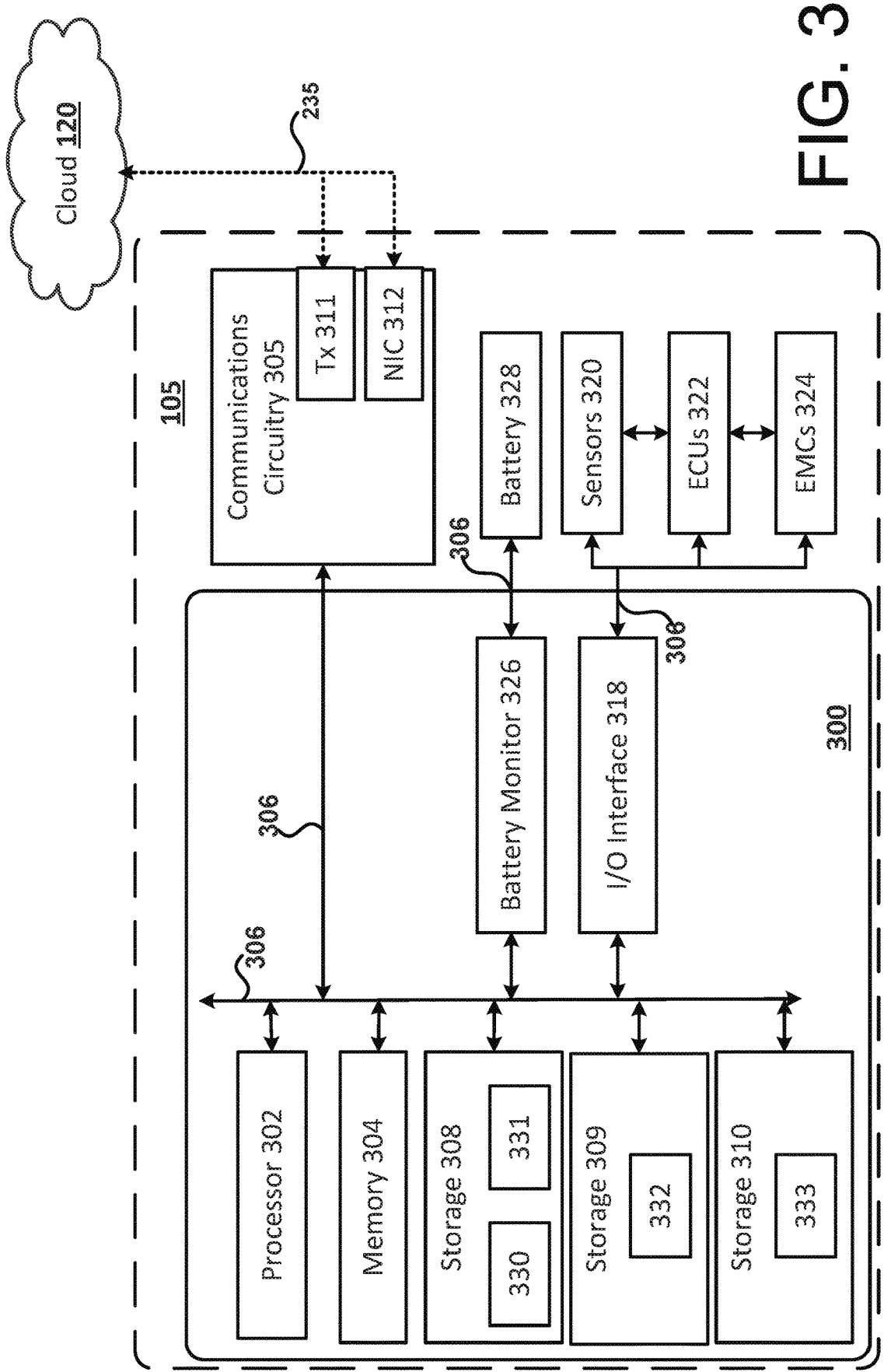
FIG. 3 illustrates an example implementation of a VECD, in accordance with various embodiments.

In embodiments, the vehicle 105, as alluded to earlier, may include a vehicle-embedded computer device (VECD) (e.g., VECD 300 shown and described with regard to FIG. 3). The VECD may be any type of computer device that is mounted on, built into, or otherwise embedded in a vehicle and is capable of recording, storing, and/or transferring digital data to/from other computer devices. In some embodiments, the VECD may be a computer device used to control one or more systems of the vehicle 105, such as an ECU, ECM, embedded system, microcontroller, control module, EMS, OBD devices, DME, MDTs, etc.

The VECD may include one or more processors (having one or more processor cores and optionally, one or more hardware accelerators), memory devices, communication devices, etc. that may be configured to carry out various functions according to the various embodiments discussed here. For example, the VECD may execute instructions stored in a computer-readable medium, or may be pre-configured with the logic (e.g., with appropriate bit streams, logic blocks, etc.) to monitor or otherwise obtain data from various sources; operate/implement a classification engine to assign a classification to the data according to the data source from which the data is obtained; and operate/implement a data storage controller to determine, based on the classification, a data store of a plurality of data stores disposed in the vehicle, in which to store the data, and store in the determined data store. In some embodiments, the VECD may execute instructions stored in a computer-readable medium, or may be pre-configured with the logic (e.g., with appropriate bit streams, logic blocks, etc.) to monitor or otherwise obtain data from various sources; operate classification logic to assign a classification to the data according to the data source from which the data is obtained; operate decision logic to determine, based on the classification, a data store of a plurality of data stores in which to store the data; and operate storage logic to control storage of the data in the determined data store. The various methods, procedures, processes, etc. for classifying the data for storage is discussed infra with regard to FIGS. 2-4.

The data obtained by the VECD may include sensor data from one or more sensors embedded in the vehicle 105, data packets from other VECDs included in other vehicles 105 (not shown by FIG. 1), data packets and/or data streams from cloud 120 and/or network infrastructure (e.g., core network elements of a cellular communications network, etc.), navigation signaling/data from on-board navigations systems (e.g., global navigation satellite system (GNSS), global positioning system (GPS), etc.), and/or the like. In embodiments, the VECD may also include, or operate in conjunction with communications circuitry (e.g., communications circuitry 205 shown and described with regard to FIG. 2) and/or input/output (I/O) interface circuitry (e.g., I/O interface 318 shown and described with regard to FIG. 2) in order to obtain the data for the various sources.

The communications circuitry of the vehicle 105 may communicate with the cloud 120 via the wireless access node 110. The wireless access node 110 may be one or more hardware computer devices configured to provide wireless communication services to mobile devices (for example, VECD in vehicle 105 or some other suitable device) within a coverage area or cell associated with the wireless access node 110. The wireless access node 110 may include a transmitter/receiver (or alternatively, a transceiver) connected to one or more antennas, one or more memory devices, one or more processors, one or more network interface controllers, and/or other like components. The one or more transmitters/receivers may be configured to transmit/receive data signals to/from one or more mobile devices via a link (e.g., link 135A). Furthermore, one or more network interface controllers may be configured to transmit/receive with various network elements (e.g., one or more servers within a core network, etc.) over another backhaul connection (not shown). In embodiments, the VECD may generate and transmit data to the wireless access node 110 over link 135A, and the wireless access node 110 may provide the data to the cloud 120 over backhaul link 135B. Additionally, during operation of the vehicle 105, the wireless access node 110 may obtain data intended for the VECD from the cloud 120 over link 135B, and may provide that data to the VECD over link 135A. The communications circuitry in the vehicle 105 may communicate with the wireless access node 110 in accordance with one or more wireless communications protocols as discussed herein.

As an example, the wireless access node 110 may be a base station associated with a cellular network (e.g., an eNB in an LTE network, a gNB in a new radio access technology (NR) network, a WiMAX base station, etc.), an RSU, a remote radio head, a relay radio device, a smallcell base station (e.g., a femtocell, picocell, home evolved nodeB (HeNB), and the like), or other like network element. In embodiments where the wireless access node is a base station, the wireless access node 110 may be deployed outdoors to provide communications for the vehicle 105 when the vehicle 105 is operating at large, for example when deployed on public roads, streets, highways, etc.

In some embodiments, the wireless access node 110 may be a gateway (GW) device that may include one or more processors, communications systems (e.g., including network interface controllers, one or more transmitters/receivers connected to one or more antennas, and the like), and computer readable media. In such embodiments, the GW may be a wireless access point (WAP), a home/business server (with or without radio frequency (RF) communications circuitry), a router, a switch, a hub, a radio beacon, and/or any other like network device. In embodiments where the wireless access node 110 is a GW, the wireless access node 110 may be deployed in an indoor setting, such as a garage, factory, laboratory or testing facility, and may be used to provide communications for while parked, prior to sale on the open market, or otherwise not operating at large.

In embodiments, the cloud 120 may represent the Internet, one or more cellular networks, a local area network (LAN) or a wide area network (WAN) including proprietary and/or enterprise networks, Transfer Control Protocol (TCP)/Internet Protocol (IP)-based network, or combinations thereof. In such embodiments, the cloud 120 may be associated with a network operator who owns or controls equipment and other elements necessary to provide network-related services, such as one or more base stations or access points (e.g., wireless access node 110), one or more servers for routing digital data or telephone calls (for example, a core network or backbone network), etc. Implementations, components, and protocols used to communicate via such services may be those known in the art and are omitted herein for the sake of brevity.

In some embodiments, the cloud 120 may be a system of computer devices (e.g., servers, storage devices, applications, etc. within or associated with a data center or data warehouse) that provides access to a pool of computing resources. The term "computing resource" may refer to a physical or virtual component within a computing environment and/or within a particular computer device, such as memory space, processor time, electrical power, input/output operations, ports or network sockets, and the like. In these embodiments, the cloud 120 may be a private cloud, which offers cloud services to a single organization; a public cloud, which provides computing resources to the general public and shares computing resources across all customers/users; or a hybrid cloud or virtual private cloud, which uses a portion of resources to provide public cloud services while using other dedicated resources to provide private cloud services. For example, the hybrid cloud may include a private cloud service that also utilizes one or more public cloud services for certain applications or users, such as providing obtaining data from various data stores or data sources. In embodiments, a common cloud management platform (e.g., implemented as various virtual machines and applications hosted across the cloud 120 and database systems) may coordinate the delivery of data to the VECD of vehicle 105. Implementations, components, and protocols used to communicate via such services may be those known in the art and are omitted herein for the sake of brevity.

According to various embodiments, the VECD of vehicle 105 may obtain and/or process relatively large volumes of data through classification of data for storage purposes, which may be used to guide the data into an individual data storage device or storage space of a plurality of data storage devices or spaces. The classification of the data may be based on various parameters or criteria, such as how the data is created, intended use or application, processing requirements, delivery or transmission/reception requirements, and/or the like. In some embodiments, there may be a three level storage hierarchy that is optimized in terms of speed, cost, and size and may be based on the timeliness, type and use of the data in question. Furthermore, hierarchical storage management mechanisms of the example embodiments may allow for coupling of existing and future storage solutions.

In various embodiments, obtained data may be categorized into three categories based on the source of the data or the intended or desired destination of the data. An example of such categorization is shown by table 1.

TABLE 1 example data categorization for hierarchical storage.

| Cloud | V2V | 3$^{rd}$ Party |
|---|---|---|
| High definition maps sent from cloud to VECDs for route planning and redundancy in interpreting sensor data (e.g., from Cloud to VECDs) | Cooperative driving (e.g., vehicle location/position, vehicle metrics such as speed, direction of travel, road conditions, anomalies, etc.) | V2I (e.g., traffic lights, digital signage, local map updates, dynamic road condition updates from RSUs to VECDs, etc.) |

TABLE 1-continued example data categorization for hierarchical storage.

| Cloud | V2V | 3rd Party |
|---|---|---|
| Anomalies/dynamic data upload to the cloud (from VECDs to Cloud) | Cooperative processing requests to other accessible vehicles (e.g., combining different parts of maps available in a number of different vehicles, accessing emergency information that is captured from nearby vehicles etc.) | Uploads of large data while relatively immobile (e.g., parked) at particular locations (e.g., gas stations, parking areas, garages, etc.) from VECDs to an edge cloud using GW type devices. |
| Infotainment data for temporary viewing (e.g., video content) from cloud to VECDs | Message relaying (e.g., emergency broadcasts, advance warning system messaging, etc.) | Bandwidth efficient information routing (e.g., non-time critical information stored at distributed small clouds) that can be downloaded to VECDs and/or transferred to other distributed cloud storages that are on the route of the vehicle using the VECD as a relay or messenger for other devices. This may be used to alleviate network congestion and/or overload scenarios. |
| Inference models downloaded from the cloud to VECDs based on current driving conditions/scope. | Cooperative processing requests to other accessible vehicles (e.g. combining different parts of maps available in a number of different vehicles, accessing emergency information that is captured from nearby vehicles, etc.) | |

As shown in table 1, data may be identified and organized based on the source of the data, intended/desired destination of the data, the intended use of the data, data access speed requirements and/or capabilities, timeliness requirements and/or capabilities, priority assigned to the application class, size, etc. Each field of table 1 may be used as a basis for mapping the data to local storage devices in the vehicle 105 or to the cloud 120. Logical components and interaction points involved in storage mapping is shown and described with regard to FIG. 2, and the mapping of data categories to various levels of storage components in a VECD is shown and described with regard to FIG. 3

Figure 2:
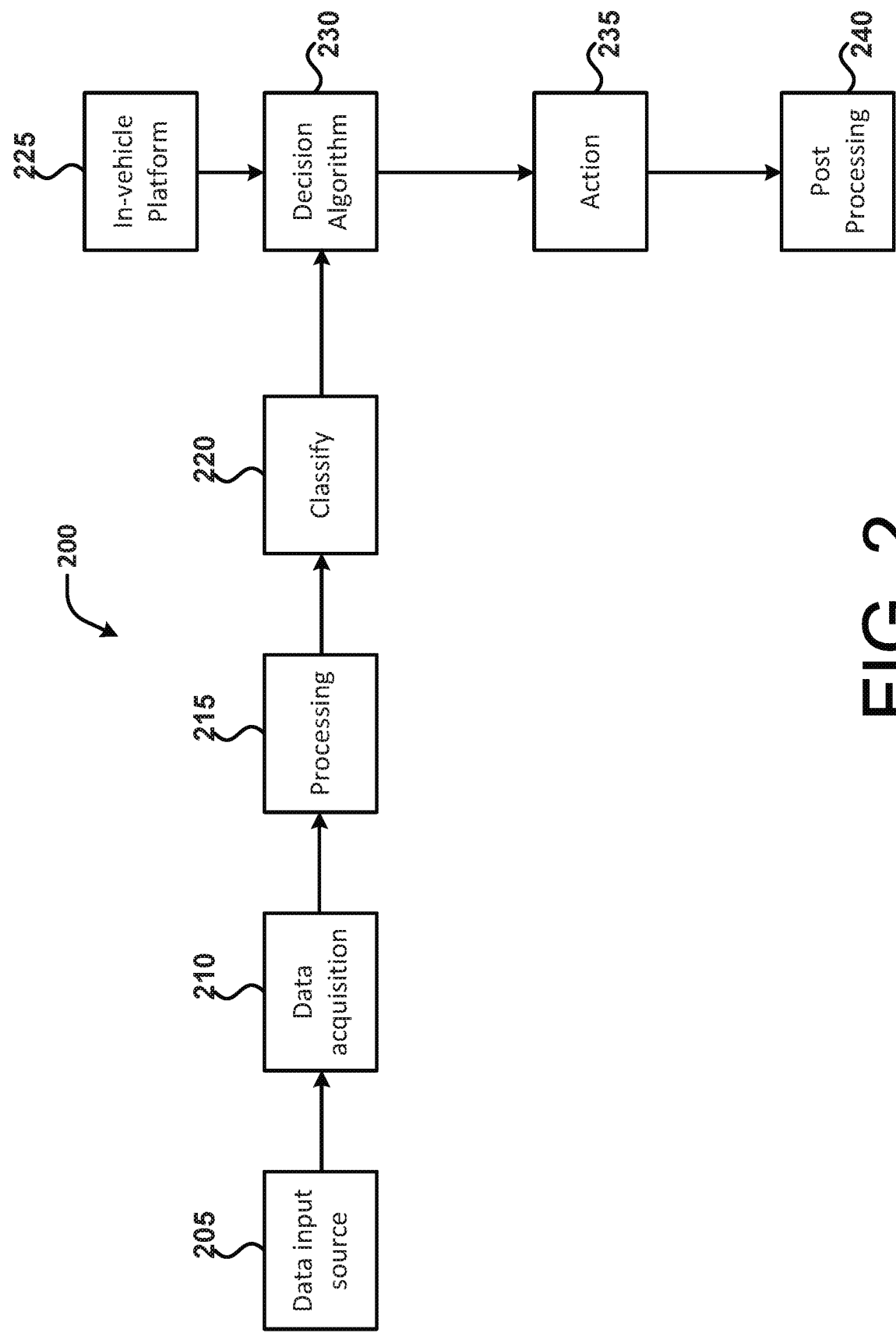
FIG. 2 illustrates a process for hierarchical storage mapping performed by logical components of a VECD, in accordance with various embodiments.

FIG. 2 illustrates a process 200 for hierarchical storage mapping performed by logical components of a VECD, in accordance with various embodiments. For illustrative purposes, the operations of process 200 are described as being performed by various components that may be implemented in vehicle 105 (e.g., devices/components shown and described with regard to FIG. 3).

Process 200 may begin at node 205 where data may be obtained from various data input sources. For example, vehicle 105 may have a broad range of embedded sensors or access to remote sensors, which may allow various systems of the vehicle 105 to sense the world outside and inside the cabin. The input from those sensors are represented as the data input at node 205. Additionally or alternatively, vehicle 105 may be network-enabled and capable of obtaining data from various remote computing devices, such as network elements and/or computers/servers of cloud 120. The input from those remote devices are also represented as the data input at node 205.

Node 210 may include data acquisition. Data acquisition may involve orchestrating how each sensor is accessed and how frequently the sampling from each sensor takes place. Note 215 may include data processing. Data processing may include filtering and removal of noise within the sampled data to prepare the sampled data for higher order classification. Depending on the implementation, the nodes 205-215 may be combined into fewer nodes/blocks or a single node/block for efficiency or for platform compatibility reasons.

Node 220 may include classifying the processed data (e.g., using a classification engine). The classification may involve sorting each set of sampled data according to a target application identifier (ID) and/or assigning a level of priority to the sampled data depending on the type of application for which the data is intended. For example, temperature sensor data for some applications (e.g., for ambient temperature reporting) may not be as time critical as real-time camera data or Light Imaging Detection And Ranging (LIDAR) data, and as such, the temperature sensor data may be treated with lower priority than the real-time camera data or LIDAR data. In another example, temperature sensor data for some applications (e.g., for catalytic converter and/or fuel injection control systems) may be more time critical than real-time camera data or LIDAR data, and as such, the temperature sensor data may be treated with a higher priority than the real-time camera data or LIDAR data.

Other attributes that are assigned during the classification phase may include timeliness requirements, data size, and/or the processing requirements for a high level understanding of sampled data. As used herein, the phrase "higher level understanding" may refer to the creation of metadata using raw data samples. For example, raw visual data captured by a camera or image sensor may be used and grouped to an unidentified object (e.g., a pothole). The sensor data from multiple sensors related to that event can be grouped and associated with the event for later analysis and (re)training of machine learning models to recognize potholes. In multimodal systems, multiple sensor inputs are often fused to achieve similar high level understanding of data to take appropriate actions at the system level.

The output of the classification node 220 is fed into a decision algorithm of a decision engine at node 230. The decision algorithm may also accept input from an in-vehicle platform of node 225. The in-vehicle platform may comprise various components/devices of the vehicle 105 (e.g., those shown and described with regard to FIG. 3). The input from node 225 may include state information related to those devices/components. Examples of state information may include radio link strength and/or quality for wireless connectivity, hardware workload and/or utilization, processor time, local and remote storage availability, and/or other information pertaining to utilized computing/network resources.

The decision algorithm at node 230 may jointly assesses how the classified data needs to be handled and the platform's instantaneous state to determine an optimum course of action. For example, if a wireless connection is not available when incoming video data needs to be transmitted and stored on the cloud 120, the decision algorithm at node 230 may route this video data to a temporary local storage until the wireless connection becomes available. In another example, if a wireless connection is not available or is relatively weak when time-critical sensor data needs to be analyzed using algorithms stored and implemented by the cloud 120, the decision algorithm at node 230 may use sub-optimal algorithms and/or processor resources available locally instead of using cloud resources in order not to increase latency.

The action at node 235 (performed using e.g., a controller) may allocate the required hardware and/or software resources to complete a target task defined by the decision algorithm at node 230. Additionally, further post-processing at node 240 may be required depending on the parameters, criteria, conditions, etc. required to carry out the action at node 235. Examples of such post-processing at node 240 may include data compression, deduplication for the purpose of saving storage space, etc.

FIG. 3 illustrates an example implementation of a VECD 300, in accordance with various embodiments. FIG. 3 shows a block diagram of an example of components that may be present in a vehicle 105 and a VECD 300. The VECD 300 may include any combinations of the components shown FIG. 2. The components may be implemented as integrated circuits (ICs) or portions thereof, discrete electronic devices, or other modules, logic, hardware, software, firmware, middleware or a combination thereof adapted in the VECD 300, or as components otherwise incorporated within a chassis of a larger system.

The VECD 300 may be an embedded system or any other type of computer device discussed herein. In one example, the VECD 300 may be an EEMS, ECM, or an ECU as discussed herein. In another example, the VECD 300 may be an IVI or an ICE device. In another example, the VECD 300 may be a separate and dedicated and/or special-purpose computer device designed specifically to carry out the data management solutions of the embodiments discussed herein.

The VECD 300 may include a processor 302 (also referred to as "processor circuitry 302") may be one or more processing elements configured to perform basic arithmetical, logical, and input/output operations by carrying out instructions. Processor 302 may be implemented as a stand-alone system/device/package or as part of an existing system/device/package (e.g., an ECU/ECM, EEMS, etc.) of the vehicle 105. The processor 302 may be one or more microprocessors, one or more single-core processors, one or more multi-core processors, one or more multithreaded processors, one or more ultra-low voltage processors, one or more embedded processors, one or more DSPs, one or more FPDs (hardware accelerators) such as FPGAs, structured ASICs, programmable SoCs (PSoCs), etc., and/or other processor or processing/controlling circuit. The processor 302 may be a part of a system on a chip (SoC) in which the processor 302 and other components discussed herein are formed into a single IC or a single package.

In embodiments, the processor 302 may include a sensor hub, which may act as a coprocessor by processing data obtained from the sensors 322. The sensor hub may include circuitry configured to integrate data obtained from each of the sensors 322 by performing arithmetical, logical, and input/output operations. In embodiments, the sensor hub may capable of timestamping obtained sensor data, providing sensor data to the processor 302 in response to a query for such data, buffering sensor data, continuously streaming sensor data to the processor 302 including independent streams for each sensor 322, reporting sensor data based upon predefined thresholds or conditions/triggers, and/or other like data processing functions.

The memory 304 may be circuitry configured to store data or logic for operating the VECD 300. Memory 304 may include number of memory devices may be used to provide for a given amount of system memory. As examples, the memory 304 can be any suitable type, number and/or combination of volatile memory devices (e.g., random access memory (RAM), dynamic RAM (DRAM), static RAM (SAM), etc.) and/or non-volatile memory devices (e.g., read-only memory (ROM), erasable programmable read-only memory (EPROM), electrically erasable programmable read-only memory (EEPROM), flash memory, anti-fuses, etc.) that may be configured in any suitable implementation as are known.

Where FPDs are used, the processor 302 and memory 304 (and/or storage device 308) may comprise logic blocks or logic fabric, memory cells, input/output (I/O) blocks, and other interconnected resources that may be programmed to perform various functions of the example embodiments discussed herein. The memory cells may be used to store data in lookup-tables (LUTs) that are used by the processor 302 to implement various logic functions. The memory cells may include any combination of various levels of memory/storage including, but not limited to, EPROM, EEPROM, flash memory, SRAM, anti-fuses, etc.

Data storage devices 308, 309, and 310 (with shared or respective controllers) may provide for persistent storage of information such as data, applications 330 and data 331, data 332, data 333, operating systems, etc. The storage device 308, 309, 310 may be implemented as solid state drives (SSDs); solid state disk drive (SSDD); serial AT attachment (SATA) storage devices (e.g., SATA SSDs); flash drives; flash memory cards, such as SD cards, microSD cards, xD picture cards, and the like, and USB flash drives; three-dimensional cross-point (3D Xpoint) memory devices; on-die memory or registers associated with the processor 302; hard disk drives (HDDs); micro HDDs; resistance change memories; phase change memories; holographic memories; or chemical memories; among others. As shown, the storage device 308, 309, 310 are included in the VECD 300; however, in other embodiments, any of the storage device 308, 309, 310 may be implemented as separate devices that are mounted in vehicle 105 separate from the other elements of VECD 300.

According to various embodiments, the memory 304, and storage device 308, 309, 310 may be classified into a storage hierarchy (also referred to as "non-volatile storage hierarchy") in the vehicle 105, which may be organized into two or more sections. In the example shown by FIG. 3, the storage hierarchy is divided into three sections: a first tier storage or storage 1 (e.g., storage device 308), a second tier storage or storage 2 (e.g., storage device 309), and a third tier storage or storage 3 (e.g., storage device 310). Each of the storage hierarchy sections may include one or more storage devices varying according to their cost, durability, speed, and/or power characteristics. Further, memory 304 and/or hardware accelerator of processor 302 may include the classification engine, the decision engine and data storage drivers for the data storage controllers to respectively perform the operations associated with nodes 220, 230 and 235 of FIG. 2).

In embodiments, sensor data from sensors 320, and/or state information from ECUs 322 and/or EMCs 324 may be routed to the memory 304 (e.g., volatile storage, DRAM, etc.) prior to processing (see e.g., nodes 205, 210, and 215 of FIG. 2). The memory 304 may also be organized into multiple blocks depending on the speed of acquisition from different sensors 320, ECUs 322, and/or EMCs 324, and the availability of local volatile storage on the sensors/ECUs/ EMCs themselves, if any. After processing, certain types of data may be allocated to, or remain in the memory 304. Examples of the types of data that may be allocated for storage in memory 304 may include data that is intended to have a relatively short lifetime as compared to other data types (e.g. cabin comfort settings for passengers who do not use the vehicle 105 regularly (e.g., guest passengers), temporary traffic notifications and warnings for particular routes, etc.); sensitive and/or personally identifying data that should not persist (e.g. photographs, biometric data (e.g., voice or fingerprints), etc.; data to be buffered or intermediate processing data required by one or more sensors 320 or offered by sensors 320 before being routed to a longer term destination (e.g., storage 1, storage 2, or storage 3).

In embodiments, storage 1 (e.g., storage device 308) may be more expensive but higher performance storage device as compared to the other storage sections. Examples of storage 1 devices may include 3D Xpoint and/or peripheral component interconnect express (PCIe) SSDs. Storage 1 may be allocated for storing short term data that may need to persist for a longer time period than data stored in memory 304 but less than storage 2 or 3 (e.g., a few days or less) and/or data that is needed at higher speeds for the processing locally. Examples of the data types stored in storage 1 devices may include text, audio, or video content data subject to digital rights management (DRM) protections, licensing, copyright, etc.; high definition maps downloaded from a geo-mapping or navigation service (e.g., provided by cloud 120), which may be required for turn-by-turn navigation applications; metadata gathered from the sensors 320, ECUs 322, EMCs 324 that may be used to organize data in the higher latency tiers (e.g., storage 2 and/or 3) to reduce the amount of data accessed from slower storage; and/or the like. In some examples, the storage 1 devices may act as a caching system for the higher (slower) storage sections.

Storage 2 devices (e.g., storage device 309) may be "middle ground" storage devices in terms of expense and performance capabilities as compared to the other storage sections (e.g., less expensive and lower in performance than storage 1 but more expensive and higher performance capabilities than storage 3). Examples of storage 2 devices may include SATA SSDs or HDDs that offer larger storage capacity than storage 1 devices, but have relatively lower performance capabilities than the storage 1 devices. Storage 2 may store data that needs to persist over a relatively long time period, such as one or more weeks to one or more months. Examples of the types of data that may be stored in storage 2 may include, maps for large areas/regions and/or to be used with less graphically intensive applications; driver and regular passenger comfort settings (e.g., seat position, mirror angles, cabin temperature settings, favorite radio stations etc.); vehicle maintenance history to assist the owner (e.g. oil changes, filter changes, parts changes etc.); control system configuration data, such as configurations and/or related data specified by AUTOSAR standards and/or the like; data dumps from the various sensors 320, ECUs 322, EMCs 324, which is not required for current driving or is otherwise relatively latency and/or time-insensitive data.

Storage 3 devices (e.g., data storage 310) may be the least expensive devices, storage devices with the lowest performance capabilities as compared to the other storage sections (e.g., less expensive and lower in performance than storage 1 and 2), and/or storage devices that have the highest latency (e.g., longest write and/or retrieval times, etc.) as compared to the other storage sections. In some embodiments, the storage 3 devices may be remote storage systems, such as storage systems provided by the cloud 120 with the highest latency due to intervening network communication. Storage 3 may be considered to be the "opportunistic" storage area where data is eventually transferred elsewhere, but with uncertainty regarding when exactly such transfer will occur. During the intermediate wait time, data intended for storage 3 may be saved in storage 2. Examples of the types of data that may be stored in storage 3 may include, data associated with detected road conditions (e.g., potholes and their locations, accidents on the road, etc.); vehicle analytics data that may be stored on the cloud 120 (e.g., weekly diagnostics reports for various control systems of the vehicle 105, driver handling logs, "blackbox" accident or collision data, dashcam video or audio content, etc.); update information (e.g., up-to-date map or navigation information to share with other vehicles 105, information on traffic conditions to inform other drivers, etc.); and/or the like.

In some embodiments, the storage devices 308-310 may include an operating system (OS), which may be a general purpose operating system or an operating system specifically written for and tailored to the VECD 300. The OS may include one or more drivers, libraries, and/or application programming interfaces (APIs), which provide program code and/or software components for applications 330 and/or control system configurations to control and/or obtain/process data from one or more sensors 320, ECUs 322, and/or EMCs 324.

The applications 330 may be software modules/components used to perform various functions of the VECD 300 and/or to carry out functions of the example embodiments discussed herein. For example, the applications 330 may comprise logic for the corresponding nodes discussed with regard to FIG. 2, namely, data acquisition logic 210, data processing logic 215, classification logic 220, vehicle state acquisition logic 225, decision logic 230 (also referred to as "data storage logic 230" and the like), action logic 235, and/or post-processing logic 240.

In embodiments where the processor 302 and memory 304 includes hardware accelerators (e.g., FPGA cells) as well as processor cores, the hardware accelerators (e.g., the FPGA cells) may be pre-configured (e.g., with appropriate bit streams, logic blocks/fabric, etc.) with the logic to perform some functions of the various nodes of FIG. 2 (in lieu of employment of programming instructions to be executed by the processor core(s)). This may include, for example a (FPGA based) data acquisition engine 210, a hardware (FPGA based) data processor 215, a (FPGA based) classification engine 220, a (FPGA based) vehicle state acquisition engine 225, a (FPGA based) decision engine 230, a (FPGA based) action or task engine 235 and/or a (FPGA based) data storage controller 235, and/or a hardware (FPGA based) data processor 240.

The components of VECD 300 and/or vehicle 105 may communicate with one another over the bus 306. In various embodiments, bus 306 may be a controller area network (CAN) bus system, a Time-Trigger Protocol (TTP) system, or a FlexRay system, which may allow various devices (e.g., ECUs 322, sensors 320, EMCs 324, etc.) to communicate with one another using messages or frames. Suitable implementations and general functionality of CAN, TTP, and FlexRay bus systems are known, and are readily implemented by persons having ordinary skill in the art. Additionally or alternatively, the bus 306 may include any number of technologies, such as a Local Interconnect Network (LIN); industry standard architecture (ISA); extended ISA (EISA); PCI; PCI extended (PCIx); PCIe; an Inter-Integrated Circuit (I2C) bus; a Parallel Small Computer System Interface (SPI) bus; point to point interfaces; a power bus; a proprietary bus, for example, used in a SoC based interface; or any number of other technologies.

The communications circuitry 305 may include circuitry for communicating with a wireless network or wired network. For example, the communications system 205 may include transceiver (Tx) 311 and network interface controller (NIC) 312. NIC 312 may be included to provide a wired communication link to the cloud 120 and/or other devices. The wired communication may provide an Ethernet connection, an Ethernet-over-USB, and/or the like, or may be based on other types of networks, such as DeviceNet, ControlNet, Data Highway+, PROFIBUS, or PROFINET, among many others. An additional NIC 312 may be included to allow connect to a second network (not shown) or other devices, for example, a first NIC 312 providing communications to the cloud 120 over Ethernet, and a second NIC 312 providing communications to other devices over another type of network, such as a personal area network (PAN) including a personal computer (PC) device.

The Tx 311 may include one or more radios to wirelessly communicate with the cloud 120 and/or other devices. The Tx 311 may include hardware devices that enable communication with wired networks and/or other devices using modulated electromagnetic radiation through a solid or non-solid medium. Such hardware devices may include switches, filters, amplifiers, antenna elements, and the like to facilitate the communications over the air (OTA) by generating or otherwise producing radio waves to transmit data to one or more other devices, and converting received signals into usable information, such as digital data, which may be provided to one or more other components of VECD 300.

Communications circuitry 305 may include one or more processors (e.g., baseband processors, modems, etc.) that are dedicated to a particular wireless communication protocol (e.g., Wi-Fi and/or IEEE 802.11 protocols), a cellular communication protocol (e.g., 5th Generation (5G) communication systems, Long Term Evolution (LTE), WiMAX, Groupe Speciale Mobile Association (GSMA), and the like), a wireless personal area network (WPAN) protocol (e.g., IEEE 802.15.4-802.15.5 protocols, Open Mobile Alliance (OMA) protocols, Bluetooth or Bluetooth low energy (BLE), etc.), and/or a wired communication protocol (e.g., Ethernet, Fiber Distributed Data Interface (FDDI), Point-to-Point (PPP), etc.).

The input/output (I/O) interface 318 may include circuitry, such as an external expansion bus (e.g., Universal Serial Bus (USB), FireWire, etc.), used to connect VECD 300 with external components/devices, such as sensors 320, electronic control units (ECUs) 322, and electro-mechanical components (EMCs) 324. I/O interface circuitry 318 may include any suitable interface controllers and connectors to interconnect one or more of the processor circuitry 302, memory 304, storage 308-310, communication circuitry 305, and the other components of VECD 300. The interface controllers may include, but are not limited to, memory controllers, storage controllers (for example, redundant array of independent disk (RAID) controllers, baseboard management controllers (BMCs), input/output controllers, host controllers, etc. The connectors may include, for example, busses (for example, bus 306), ports, slots, jumpers, interconnect modules, receptacles, modular connectors, etc.

Sensors 320 may be any device configured to detect events or environmental changes, convert the detected events into electrical signals and/or digital data, and transmit/send the signals/data to the VECD 300 and/or one or more ECUs 322. Some of the sensors 320 may be sensors used for various vehicle control systems, and may include, inter alia, exhaust sensors including exhaust oxygen sensors to obtain oxygen data and manifold absolute pressure (MAP) sensors to obtain manifold pressure data; mass air flow (MAF) sensors to obtain intake air flow data; intake air temperature (IAT) sensors to obtain IAT data; ambient air temperature (AAT) sensors to obtain AAT data; ambient air pressure (AAP) sensors to obtain AAP data; catalytic converter sensors including catalytic converter temperature (CCT) to obtain CCT data and catalytic converter oxygen (CCO) sensors to obtain CCO data; vehicle speed sensors (VSS) to obtain VSS data; exhaust gas recirculation (EGR) sensors including EGR pressure sensors to obtain ERG pressure data and EGR position sensors to obtain position/orientation data of an EGR valve pintle; Throttle Position Sensor (TPS) to obtain throttle position/orientation/angle data; a crank/cam position sensors to obtain crank/cam/piston position/orientation/angle data; coolant temperature sensors; and/or other like sensors embedded in vehicles 105. The sensors 320 may include other sensors such as an accelerator pedal position sensor (APP), accelerometers, magnetometers, level sensors, flow/fluid sensors, barometric pressure sensors, and the like.

Some of the sensors 320 may be sensors used for other systems of the vehicle, such as navigation, autopilot systems, object detection, and/or the like. Examples of such sensors 320 may include, inter alia, one or more MEMS with piezoelectric, piezoresistive and/or capacitive components, which may be used to determine environmental conditions or location information related to the VECD 300. In embodiments, the one or more MEMS may include one or more 3-axis accelerometers, one or more 3-axis gyroscopes, and one or more magnetometers. In some embodiments, the sensors 320 may also include one or more gravimeters, altimeters, barometers, proximity sensors (e.g., infrared radiation detector and the like), depth sensors, ambient light sensors, thermal sensors, ultrasonic transceivers, and/or positioning circuitry. The positioning circuitry may also be part of, or interact with, the communications circuitry 305 to communicate with components of a positioning network, such as a GNSS and/or GPS. In some embodiments, the positioning circuitry may be a Micro-Technology for Positioning, Navigation, and Timing (Micro-PNT) IC that uses a master timing clock to perform position tracking/estimation without GNSS and/or GPS.

Individual ECUs 322 may be embedded systems or other like computer devices that control a corresponding system of the vehicle 105. In embodiments, individual ECUs 322 may each have the same or similar components as the VECD 300, such as a microcontroller or other like processor device, memory device(s), communications interfaces, and the like. In embodiments, the ECUs 322 may include, inter alia, a Drivetrain Control Unit (DCU), an Engine Control Unit (ECU), an Engine Control Module (ECM), EEMS, a Powertrain Control Module (PCM), a Transmission Control Module (TCM), a Brake Control Module (BCM) including an anti-lock brake system (ABS) module and/or an electronic stability control (ESC) system, a Central Control Module (CCM), a Central Timing Module (CTM), a General Electronic Module (GEM), a Body Control Module (BCM), a Suspension Control Module (SCM), a Door Control Unit (DCU), a Speed Control Unit (SCU), a Human-Machine Interface (HMI) unit, a Telematic Control Unit (TTU), a Battery Management System and/or any other entity or node in a vehicle system. In some embodiments, the one or more of the ECUs 322 and/or VECD 300 may be part of or included in a Portable Emissions Measurement Systems (PEMS).

The EMCs 324 may be devices that allow VECD 300 to change a state, position, orientation, move, and/or control a mechanism or system. The EMCs 324 may include one or more switches, actuators (e.g., valve actuators, fuel injectors, ignition coils, etc.), motors, thrusters, and/or other like electro-mechanical components. In embodiments, VECD 300 and/or ECUs 322 may be configured to operate one or more EMCs 324 by transmitting/sending instructions or control signals to the EMCs 324 based on detected events.

In embodiments, individual ECUs 322 may be capable of reading or otherwise obtaining sensor data from one or more sensors 320, processing the sensor data to generate control system data, and providing the control system data to the VECD 300 for processing. The control system information may be a type of state information discussed previously. For example, an ECM or ECU may provide engine revolutions per minute (RPM) of an engine of the vehicle 105, fuel injector activation timing data of one or more cylinders and/or one or more injectors of the engine, ignition spark timing data of the one or more cylinders (e.g., an indication of spark events relative to crank angle of the one or more cylinders), transmission gear ratio data and/or transmission state data (which may be supplied to the EMC/ECU by the TCU), real-time calculated engine load values from the ECM, etc.; a TCU may provide transmission gear ratio data, transmission state data, etc.; and the like.

The battery 328 may power the VECD 300. In embodiments, the battery 328 may be a typical lead-acid automotive battery, although in some embodiments, such as when vehicle 105 is a hybrid vehicle, the battery 328 may be a lithium ion battery, a metal-air battery, such as a zinc-air battery, an aluminum-air battery, a lithium-air battery, a lithium polymer battery, and the like. The battery monitor 326 may be included in the VECD 300 to track/monitor various parameters of the battery 328, such as a state of charge (SoCh) of the battery 328, state of health (SoH), and the state of function (SoF) of the battery 328. The battery monitor 326 may include a battery monitoring IC, which may communicate battery information to the processor 302 over the bus 306.

While not shown, various other devices may be present within, or connected to, the VECD 300. For example, I/O devices, such as a display, a touchscreen, or keypad may be connected to the VECD 300 via bus 306 to accept input and display outputs. In another example, GNSS and/or GPS circuitry and associated applications may be included in or connected with VECD 300 to determine a geolocation of the vehicle 105. In another example, the communications circuitry 305 may include a Universal Integrated Circuit Card (UICC), embedded UICC (eUICC), and/or other elements/components that may be used to communicate over one or more wireless networks.

Figure 4:
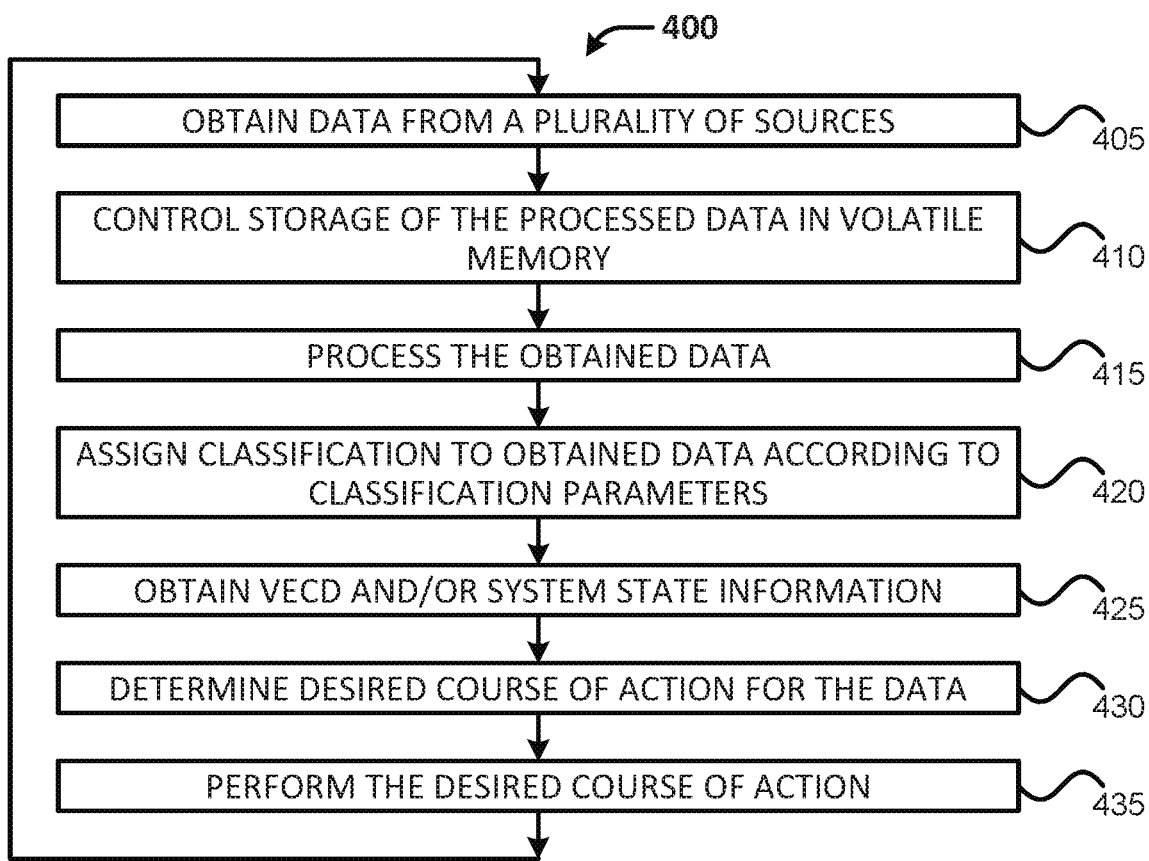
FIG. 4 illustrates process for managing data storage, in accordance with various embodiments.

FIG. 4 illustrates process 400 for managing data storage, in accordance with various embodiments. For illustrative purposes, the operations of the aforementioned processes are described as being performed by the various elements discussed with regard to FIGS. 1-3. However, it should be noted that other computing devices (or components thereof) may operate the process 400 in a multitude of implementations, arrangements, and/or environments. In embodiments, the process 400 may be implemented as program code, which when executed by a processor, causes a computer system to perform the various operations of the processes. While particular examples and orders of operations are illustrated in FIG. 4, in various embodiments, these operations may be re-ordered, separated into additional operations, combined, or omitted altogether.

Referring to FIG. 4, process 400 may begin at operation 405 where interface circuitry of VECD 300 (e.g., I/O interface 318) may monitor for, and obtain data from a plurality of sources. The act of obtaining data may include capturing control system data (CSD) from one or more ECUs 322, hardware state information/data from one or more EMCs 324 and/or ECUs 322, sensor data from one or more sensors 320, and/or network related information/data from communications circuitry 305. The VECD 300 may also obtain data (e.g., data packets and the like) from cloud 120 via the communications circuitry 305. In embodiments, the act of monitoring may include polling (e.g., periodic polling, sequential (roll call) polling, etc.) one or more sensors 320, one or more ECUs 322, and/or EMCs 324 for data during a specified/selected period of time. In some embodiments, monitoring may include sending a request for data to various sensors/modules or remote systems (e.g., cloud 120) based on requests obtained from higher layers, such as when an infotainment application requests content from cloud 120. In some embodiments, monitoring may include waiting for sensor data/CSD from various sensors/modules based on triggers or events, such as when the vehicle 105 reaches predetermined speeds and/or distances in a predetermined amount of time (with or without intermitted stops). The events/triggers may be implementation-specific and/or application-specific values. The data may be obtained from the sensors/modules according to other known methods or procedures in addition to or alternative to the techniques discussed previously.

In embodiments, at operation 405 a data acquisition engine (or data acquisition logic implemented by the processor 302) may determine data access procedures to acquire raw data from each data source and determine a sampling rate at which to access the raw data from each data source. The data access procedures and/or sampling rates may be based on the underlying hardware architecture and/or based on the sensors/ECUs/EMCs from which data is to be obtained. In such embodiments, the interface circuitry may obtain the data according to the determined sampling rate for individual data sources from which data is to be obtained.

At operation 410, a data storage controller (or data processing logic implemented by the processor 302) may control storage of the obtained data into the memory 304 prior to processing. At operation 415, a hardware data processor (or data processing logic implemented by the processor 302) may process the obtained data. In embodiments, operation 410 may include normalizing the data (e.g., converting the data into a format that can be consumed by other devices/systems, etc.), timestamping the data, stamping the data with source information (e.g., an identifier of a particular sensor/ECU/EMC from which data is obtained), stamping the data with marker information, and/or the like. The term "marker information" may refer to a reference or other like indication that may indicate a particular event within the obtained data, which may be an instance of significance for particular applications. In some embodiments, data processing at operation 410 may include generating a log of the processed data as one or more data structures or database objects (tables), where the log may be stamped with the source information. In some embodiments, separate logs may be generated for different time/date ranges and/or based on different data samples. Additionally, individual logs may be generated for data obtained from particular/individual data sources. In other embodiments, a single log may be generated for all obtained data regardless of when or where the data is obtained.

At operation 420, a classification engine (or classification logic implemented by the processor 302) may assign classifications to the data according to classification parameters. In embodiments, the classification parameters may include, inter alia, a data source from which the data is obtained, an intended destination of the data, a target application associated with the data, a processing requirement associated with the data, time delivery requirements of the data, and/or the like. In addition, the classification engine (or classification logic) may weight various classification parameters differently according to known weighting algorithms in order to prioritize desired parameters over other parameters. Additionally, classifications may be applied to the obtained data for each parameter (or a subset of parameters), which may be averaged or otherwise used to determine a final classification of the obtained data.

At operation 425, a vehicle state acquisition engine (or state information acquisition logic implemented by the processor 302) may obtain various system state information from the various sensors, ECUs, EMCs, applications, etc. As an example, the vehicle state acquisition engine (or state information acquisition logic) may obtain position or location information from GPS circuitry of the vehicle 105. In another example, the vehicle state acquisition engine (or state information acquisition logic) may obtain position, orientation, mode of operation information from one or more EMCs 324. In another example, the vehicle state acquisition engine (or state information acquisition logic) may obtain memory utilization information from the storage devices 308-310. In another example, the vehicle state acquisition engine (or state information acquisition logic) may obtain communications link quality information from the communications circuitry 305 to determine a current load or level of network connectivity. The system state information may be obtained in a same or similar manner as discussed previously with regard to monitoring for the data at operation 405, and/or according to other known methods/procedures.

At operation 430, a decision engine (or decision logic implemented by the processor 302) determine a desired course of action for the data. This may include determine an appropriate storage location for storing the data, which may be based on the assigned classification. In one example, the decision engine (or decision logic) may determine to store the data in a data storage tier based on a corresponding classification. The decision engine (or decision logic) may also take into account the system state information obtained at operation 425 when determining the appropriate course of action. In such embodiments, the action may be based on storage device utilization or availability; network resources or a current state of the communications circuitry 305; upload or transmission requirements; access speed; timeliness requirements; priority assigned to the application class of the target or intended application, and size of the data; and/or the like.

In one example, if the classification engine (or classification logic) assigned a first classification (e.g., a highest priority class/rank) to the data, the decision engine (or decision logic) may determine to store the data in a storage 1 device. In another example, the action may include storing data with a lowest priority classification in a storage 1 or storage 2 when the storage 3 devices are full or otherwise unavailable. In this example, the storage 3 may be storage provided by cloud 120, which may be unavailable due to lack of network resources, and the action may include storing data in the storage 1 or storage 2 for a predetermined period of time and determining whether the data may be transmitted to the cloud 120 at that time. In this example, the decision engine (or decision logic) may identify a current state of VECD 300 based on communications link quality information obtained from communications circuitry 305; and when the communications link quality information indicates that the link quality is below a predetermined threshold, the data may be stored in storage 2 or storage 1 regardless of a classification assigned to the data. In another example, the action may include instructing various applications to process data when a communications link is unreliable, weak, has failed, or lacks sufficient bandwidth. As used herein, an unreliable communication link may be a communications link that suffers from excessive noise or shadowing related problems, and a weak communication link may be a communications link with signal level(s) that are too low or inadequate to provide a threshold level of connectivity or quality of service.

At operation 435, an action engine (or action/task logic implemented by the processor 302) may carry out the determined course of action. In one example, the action engine (or action logic) may control a data storage controller (or data storage logic implemented by the processor 302) to store the data in a corresponding storage device. In another example, the action engine (or action logic) may control communications circuitry to transmit the data to a remote storage (e.g., storage provided by cloud 120). In another example, the action engine (or action logic) may implement an API, middleware, software glue, etc. to provide the data to one or more applications for processing and the like. After performing operation 435, process 400 may repeat as necessary or end.

Some non-limiting examples are as follows.

Example 1 may include a vehicle-embedded computer device, "VECD", comprising: interface circuitry to obtain data from a data source of a plurality of data sources, wherein at least a subset of the data sources are disposed on a vehicle within which the VECD is embedded; a classification engine coupled to the interface circuitry to assign a classification to the data according to the data source from which the data is obtained; a decision engine to determine, based on the classification, a data store of a plurality of data stores disposed in the vehicle, in which to store the data; and a data storage controller to control storage of the data in the determined data store.

Example 2 may include the VECD of example 1 and/or some other examples herein, wherein the plurality of data stores comprise a first tier data store and a second tier data store, and wherein the decision engine is to: determine to store the data in the first tier data store when the data is assigned a first classification; and determine to store the data in the second tier data store when the data is assigned a second classification.

Example 3 may include the VECD of example 2 and/or some other examples herein, wherein the plurality of data stores further comprises a third tier data store, and wherein the decision engine is to: determine to store the data in the third tier data store when the data is assigned a third classification Example 4 may include the VECD of example 2 and/or some other examples herein, wherein the data is first data, the data source is a first data source, and wherein the classification engine is to: assign the first classification to the first data based on a first target application associated with the first data, wherein the first target application has a first priority that is greater than priorities of other target applications; and assign the second classification to second data obtained from the first data source based on a second target application associated with the second data, wherein the second target application has a second priority that is lower than the first priority.

Example 5 may include the VECD of example 4 and/or some other examples herein, wherein the classification engine is to: assign a third classification to third data obtained from the first data source based on a third target application associated with the third data, wherein the third target application has a third priority that is lower than the second priority.

Example 6 may include the VECD of example 2 and/or some other examples herein, wherein the data is first data, the data source is a first data source, and wherein the classification engine is to: assign the first classification to the first data based on a first processing requirement of the first data; and assign the second classification to second data obtained from the first data source based on a second processing requirement of the second data, wherein the first processing requirement includes generation of a first amount of metadata that is greater than a second amount of metadata generated according to the second processing requirement, and wherein the second data is obtained from the first data source or a second data source of the plurality of data sources.

Example 7 may include the VECD of example 6 and/or some other examples herein, wherein the classification engine is to: assign a third classification to third data obtained from the first data source based on a third processing requirement of the third data, wherein the third processing requirement includes generation of a third amount of metadata that is less than the second amount, and wherein the third data is obtained from the first data source, the second data source, or a third data source of the plurality of data sources.

Example 8 may include the VECD of example 2 and/or some other examples herein, wherein the classification engine is to: assign the first classification to the data when an intended destination of the data is another VECD; and assign the second classification to the data when the intended destination of the data is a cloud computing service.

Example 9 may include the VECD of example 8 and/or some other examples herein, wherein the classification engine is to: assign a third classification to the data when the intended destination of the data is a third party gateway device or storage provided by a cloud computing service.

Example 10 may include the VECD of example 2 and/or some other examples herein, wherein the data is first data, the data source is a first data source, and wherein the classification engine is to: assign the first classification to the first data based on a first time delivery requirement of the first data; and assign the second classification to second data based on a second time delivery requirement of the second data, wherein the first time delivery requirement is a first amount of time that is less than a second amount of time of the second time delivery requirement.

Example 11 may include the VECD of example 10 and/or some other examples herein, wherein the classification engine is to: assign a third classification to third data based on a third time delivery requirement of the third data, wherein the third time delivery requirement is a third amount of time that is greater than the second amount of time.

Example 12 may include the VECD of example 2 and/or some other examples herein, wherein: the decision engine is to identify a current state of a communications link based on communications link quality information obtained from communications circuitry coupled with the interface circuitry; and when the communications link quality information indicates that a quality of the communications link is below a predetermined threshold, the data storage controller is to control storage of the data in the second tier data store or the first tier data store regardless of a classification assigned to the data.

Example 13 may include the VECD of example 12 and/or some other examples herein, further comprising a hardware data processor to process the data stored in the second tier data store or in the first tier data store when the data is associated with a time delivery requirement with an amount of time of that is less than other time delivery requirements of other data.

Example 14 may include the VECD of example 2 and/or some other examples herein, wherein the plurality of data stores comprise a dynamic random access memory (DRAM) storage device, and the data storage controller is to: control storage of the obtained data in the DRAM storage device prior to the classification engine's assignment of the classification to the data; and maintain storage of the data in the DRAM storage device when the data is assigned a classification that is higher in priority than the first classification.

Example 15 may include the VECD of examples 1-14 and/or some other examples herein, further comprising: a data acquisition engine to determine data access procedures to acquire raw data from each data source of the plurality of data sources, and determine a sampling rate at which to access the raw data from each data source, wherein the interface circuitry is to obtain the data according to the sampling rate determined for the data source from which the data is to be obtained.

Example 16 may include the VECD of example 15 and/or some other examples herein, wherein: the first tier data store is three dimensional cross-point data storage device or a Peripheral Component Interconnect Express (PCIe) solid-state drive (SSD); and the second tier data store is a serial AT attachment (SATA) SSD, one or more hard disk drives, or storage provided by a cloud computing service.

Example 17 may include the VECD of example 16 and/or some other examples herein, wherein the plurality of data stores further comprises a third tier data store, and wherein the third tier data store is storage provided by a cloud computing service.

Example 18 may include one or more computer-readable media, "CRM", including instructions, which when executed by a vehicle-embedded computer device, "VECD", the VECD is to: obtain data from a data source of a plurality of data sources, wherein at least a subset of the data sources are disposed on a vehicle within which the VECD is embedded; assign a classification to the data according to the data source from which the data is obtained; and determine, based on the classification, a data store of a plurality of data stores disposed in the vehicle, in which to store the data, and store in the determined data store.

Example 19 may include the one or more CRM of example 18 and/or some other examples herein, wherein the plurality of data stores comprise a first tier data store and a second tier data store, and wherein the VECD, in response to execution of the instructions, is to: determine to store the data in the first tier data store when the data is assigned a first classification; and determine to store the data in the second tier data store when the data is assigned a second classification.

Example 20 may include the one or more CRM of example 19 and/or some other examples herein, wherein the plurality of data stores further comprises a third tier data store, and wherein the VECD, in response to execution of the instructions, is to: determine to store the data in the third tier data store when the data is assigned a third classification.

Example 21 may include the one or more CRM of example 19 and/or some other examples herein, wherein the data is first data, the data source is a first data source, and wherein the VECD, in response to execution of the instructions, is to: assign the first classification to the first data based on a first target application associated with the first data, wherein the first target application has a first priority that is greater than priorities of other target applications; and assign the second classification to second data obtained from the first data source based on a second target application associated with the second data, wherein the second target application has a second priority that is lower than the first priority.

Example 22 may include the one or more CRM of example 21 and/or some other examples herein, wherein the VECD, in response to execution of the instructions, is to: assign a third classification to third data obtained from the first data source based on a third target application associated with the third data, wherein the third target application has a third priority that is lower than the second priority.

Example 23 may include the one or more CRM of example 19 and/or some other examples herein, wherein the data is first data, the data source is a first data source, and wherein the VECD, in response to execution of the instructions, is to: assign the first classification to the first data based on a first processing requirement of the first data; and assign the second classification to second data obtained from the first data source based on a second processing requirement of the second data, wherein the first processing requirement includes generation of a first amount of metadata that is greater than a second amount of metadata generated according to the second processing requirement, and wherein the second data is obtained from the first data source or a second data source of the plurality of data sources.

Example 24 may include the one or more CRM of example 23 and/or some other examples herein, wherein the VECD, in response to execution of the instructions, is to: assign a third classification to third data obtained from the first data source based on a third processing requirement of the third data, wherein the third processing requirement includes generation of a third amount of metadata that is less than the second amount, and wherein the third data is obtained from the first data source, the second data source, or a third data source of the plurality of data sources Example 25 may include the one or more CRM of example 19 and/or some other examples herein, wherein the VECD, in response to execution of the instructions, is to: assign the first classification to the data when an intended destination of the data is another VECD; and assign the second classification to the data when the intended destination of the data is a cloud computing service.

Example 26 may include the one or more CRM of example 25 and/or some other examples herein, wherein the VECD, in response to execution of the instructions, is to: assign a third classification to the data when the intended destination of the data is a third party gateway device or storage provided by a cloud computing service.

Example 27 may include the one or more CRM of example 19 and/or some other examples herein, wherein the data is first data, the data source is a first data source, and wherein the VECD, in response to execution of the instructions, is to: assign the first classification to the first data based on a first time delivery requirement of the first data; and assign the second classification to second data based on a second time delivery requirement of the second data, wherein the first time delivery requirement is a first amount of time that is less than a second amount of time of the second time delivery requirement.

Example 28 may include the one or more CRM of example 27 and/or some other examples herein, wherein the VECD, in response to execution of the instructions, is to: assign a third classification to third data based on a third time delivery requirement of the third data, wherein the third time delivery requirement is a third amount of time that is greater than the second amount of time.

Example 29 may include the one or more CRM of example 19 and/or some other examples herein, wherein the VECD, in response to execution of the instructions, is to: identify a current state of a communications link based on communications link quality information obtained from communications circuitry of the VECD; and when the communications link quality information indicates that a quality of the communications link is below a predetermined threshold, control storage of the data in the second tier data store or the first tier data store regardless of a classification assigned to the data.

Example 30 may include the one or more CRM of example 29 and/or some other examples herein, wherein the VECD, in response to execution of the instructions, is to: process the data stored in the second tier data store or in the first tier data store when the data is associated with a time delivery requirement with an amount of time of that is less than other time delivery requirements of other data.

Example 31 may include the one or more CRM of example 19 and/or some other examples herein, wherein the plurality of data stores comprise a dynamic random access memory (DRAM) storage device, and wherein the VECD, in response to execution of the instructions, is to: control storage of the obtained data in the DRAM storage device prior to assignment of the classification to the data; and determine to maintain storage of the data in the DRAM storage device when the data is assigned a classification that is higher in priority than the first classification.

Example 32 may include the one or more CRM of examples 18-31 and/or some other examples herein, wherein the VECD, in response to execution of the instructions, is to: determine data access procedures to acquire raw data from each data source of the plurality of data sources; and determine a sampling rate at which to access the raw data from each data source, wherein the data is to be obtained according to the sampling rate determined for the data source from which the data is to be obtained.

Example 33 may include the one or more CRM of example 32 and/or some other examples herein, wherein: the first tier data store is three dimensional cross-point data storage device or a Peripheral Component Interconnect Express (PCIe) solid-state drive (SSD); and the second tier data store is a serial AT attachment (SATA) SSD or one or more hard disk drives.

Example 34 may include the one or more CRM of example 33 and/or some other examples herein, wherein the plurality of data stores further comprises a third tier data store, and wherein the third tier data store is storage provided by a cloud computing service.

Example 35 may include an apparatus to be employed as a vehicle-embedded computer device, "VECD", the apparatus comprising: data acquisition means for obtaining data from a data source of a plurality of data sources, wherein at least a subset of the data sources are disposed on a vehicle within which the VECD is embedded; a classification means for assigning a classification to the data according to the data source from which the data is obtained; decision means for determining, based on the classification, a data store of a plurality of data stores disposed in the vehicle, in which to store the data; and data storage means for controlling storage of the data in the determined data store.

Example 36 may include the apparatus of example 35 and/or some other examples herein, wherein the plurality of data stores comprise a first tier data store and a second tier data store, and wherein the decision means is for: determining to store the data in the first tier data store when the data is assigned a first classification; and determining to store the data in the second tier data store when the data is assigned a second classification. Example 37 may include the apparatus of example 36 and/or some other examples herein, wherein the plurality of data stores further comprises a third tier data store, and wherein the decision means is for: determining to store the data in the third tier data store when the data is assigned a third classification.

Example 38 may include the apparatus of example 36 and/or some other examples herein, wherein the data is first data, the data source is a first data source, and wherein the classification means is for: assigning the first classification to the first data based on a first target application associated with the first data, wherein the first target application has a first priority that is greater than priorities of other target applications; and assigning the second classification to second data obtained from the first data source based on a second target application associated with the second data, wherein the second target application has a second priority that is lower than the first priority.

Example 39 may include the apparatus of example 38 and/or some other examples herein, wherein the classification means is for: assigning a third classification to third data obtained from the first data source based on a third target application associated with the third data, wherein the third target application has a third priority that is lower than the second priority.

Example 40 may include the apparatus of example 36 and/or some other examples herein, wherein the data is first data, the data source is a first data source, and wherein the classification means is for: assigning the first classification to the first data based on a first processing requirement of the first data; and assigning the second classification to second data obtained from the first data source based on a second processing requirement of the second data, wherein the first processing requirement includes generation of a first amount of metadata that is greater than a second amount of metadata generated according to the second processing requirement, and wherein the second data is obtained from the first data source or a second data source of the plurality of data sources.

Example 41 may include the apparatus of example 40 and/or some other examples herein, wherein the classification means is for: assigning a third classification to third data obtained from the first data source based on a third processing requirement of the third data, wherein the third processing requirement includes generation of a third amount of metadata that is less than the second amount, and wherein the third data is obtained from the first data source, the second data source, or a third data source of the plurality of data sources.

Example 42 may include the apparatus of example 36 and/or some other examples herein, wherein the classification means is for: assigning the first classification to the data when an intended destination of the data is another VECD; and assigning the second classification to the data when the intended destination of the data is a cloud computing service.

Example 43 may include the apparatus of example 42 and/or some other examples herein, wherein the classification means is for: assigning a third classification to the data when the intended destination of the data is a third party gateway device or storage provided by a cloud computing service.

Example 44 may include the apparatus of example 36 and/or some other examples herein, wherein the data is first data, the data source is a first data source, and wherein the classification means is for: assigning the first classification to the first data based on a first time delivery requirement of the first data; and assigning the second classification to second data based on a second time delivery requirement of the second data, wherein the first time delivery requirement is a first amount of time that is less than a second amount of time of the second time delivery requirement.

Example 45 may include the apparatus of example 44 and/or some other examples herein, wherein the classification means is for: assigning a third classification to third data based on a third time delivery requirement of the third data, wherein the third time delivery requirement is a third amount of time that is greater than the second amount of time.

Example 46 may include the apparatus of example 36 and/or some other examples herein, wherein: the decision means is for identifying a current state of a communications link based on communications link quality information obtained from communications means coupled with the apparatus; and the data storage means is for controlling storage of the data in the second tier data store or the first tier data store regardless of a classification assigned to the data when the communications link quality information indicates that a quality of the communications link is below a predetermined threshold.

Example 47 may include the apparatus of example 46 and/or some other examples herein, further comprising a hardware data processing means for processing the data stored in the second tier data store or in the first tier data store when the data is associated with a time delivery requirement with an amount of time of that is less than other time delivery requirements of other data.

Example 48 may include the apparatus of example 36 and/or some other examples herein, wherein the plurality of data stores comprises a volatile storage means, and the data storage means is for: controlling storage of the obtained data in the volatile storage means prior to the assignment of the classification to the data by the classification means; and maintaining storage of the data in the volatile storage means when the data is assigned a classification that is higher in priority than the first classification.

Example 49 may include the apparatus of examples 35-48 and/or some other examples herein, wherein the data acquisition means is further for: determining data access procedures to acquire raw data from each data source of the plurality of data sources; and determining a sampling rate at which to access the raw data from each data source, wherein the data acquisition means is for obtaining the data according to the sampling rate determined for the data source from which the data is to be obtained.

Example 50 may include the apparatus of example 49 and/or some other examples herein, wherein: the first tier data store is three dimensional cross-point data storage device or a Peripheral Component Interconnect Express (PCIe) solid-state drive (SSD); and the second tier data store is a serial AT attachment (SATA) SSD, one or more hard disk drives, or storage provided by a cloud computing service, and wherein the plurality of data stores further comprises a third tier data store, and wherein the third tier data store is storage provided by a cloud computing service.

Example 51 may include a method to be performed by a vehicle-embedded computer device, "VECD", the method comprising: obtaining, by the VECD, data from a data source of a plurality of data sources, wherein at least a subset of the data sources are disposed on a vehicle within which the VECD is embedded; assigning, by the VECD, a classification to the data according to the data source from which the data is obtained; determining, by the VECD based on the classification, a data store of a plurality of data stores disposed in the vehicle, in which to store the data, and store in the determined data store; and storing, by the VECD, in the determined data store.

Example 52 may include the method of example 51 and/or some other examples herein, wherein the plurality of data stores comprise a first tier data store and a second tier data store, and the method further comprises: determining, by the VECD, to store the data in the first tier data store when the data is assigned a first classification; and determining, by the VECD, to store the data in the second tier data store when the data is assigned a second classification.

Example 53 may include the method of example 52 and/or some other examples herein, wherein the plurality of data stores further comprises a third tier data store, and the method further comprises: determining, by the VECD, to store the data in the third tier data store when the data is assigned a third classification.

Example 54 may include the method of example 52 and/or some other examples herein, wherein the data is first data, the data source is a first data source, and the method further comprises: assigning, by the VECD, the first classification to the first data based on a first target application associated with the first data, wherein the first target application has a first priority that is greater than priorities of other target applications; and assigning, by the VECD, the second classification to second data obtained from the first data source based on a second target application associated with the second data, wherein the second target application has a second priority that is lower than the first priority.

Example 55 may include the method of example 54 and/or some other examples herein, further comprising: assigning, by the VECD, a third classification to third data obtained from the first data source based on a third target application associated with the third data, wherein the third target application has a third priority that is lower than the second priority.

Example 56 may include the method of example 52 and/or some other examples herein, wherein the data is first data, the data source is a first data source, and the method further comprises: assigning, by the VECD, the first classification to the first data based on a first processing requirement of the first data; and assigning, by the VECD, the second classification to second data obtained from the first data source based on a second processing requirement of the second data, wherein the first processing requirement includes generation of a first amount of metadata that is greater than a second amount of metadata generated according to the second processing requirement, and wherein the second data is obtained from the first data source or a second data source of the plurality of data sources.

Example 57 may include the method of example 56 and/or some other examples herein, further comprises: assigning, by the VECD, a third classification to third data obtained from the first data source based on a third processing requirement of the third data, wherein the third processing requirement includes generation of a third amount of metadata that is less than the second amount, and wherein the third data is obtained from the first data source, the second data source, or a third data source of the plurality of data sources Example 58 may include the method of example 52 and/or some other examples herein, further comprising: assigning, by the VECD, the first classification to the data when an intended destination of the data is another VECD; and assigning, by the VECD, the second classification to the data when the intended destination of the data is a cloud computing service.

Example 59 may include the method of example 58 and/or some other examples herein, further comprising: assigning, by the VECD, a third classification to the data when the intended destination of the data is a third party gateway device or storage provided by a cloud computing service.

Example 60 may include the method of example 52 and/or some other examples herein, wherein the data is first data, the data source is a first data source, and the method further comprises: assigning, by the VECD, the first classification to the first data based on a first time delivery requirement of the first data; and assigning, by the VECD, the second classification to second data based on a second time delivery requirement of the second data, wherein the first time delivery requirement is a first amount of time that is less than a second amount of time of the second time delivery requirement.

Example 61 may include the method of example 60 and/or some other examples herein, further comprising: assigning, by the VECD, a third classification to third data based on a third time delivery requirement of the third data, wherein the third time delivery requirement is a third amount of time that is greater than the second amount of time.

Example 62 may include the method of example 52 and/or some other examples herein, further comprising: identifying, by the VECD, a current state of a communications link based on communications link quality information obtained from communications circuitry of the VECD; and storing, by the VECD, the data in the second tier data store or the first tier data store regardless of a classification assigned to the data when the communications link quality information indicates that a quality of the communications link is below a predetermined threshold.

Example 63 may include the method of example 62 and/or some other examples herein, further comprising: processing, by the VECD, the data stored in the second tier data store or in the first tier data store when the data is associated with a time delivery requirement with an amount of time of that is less than other time delivery requirements of other data.

Example 64 may include the method of example 52 and/or some other examples herein, wherein the plurality of data stores comprise a dynamic random access memory (DRAM) storage device, and wherein the VECD, in response to execution of the instructions, is to: storing, by the VECD, the obtained data in the DRAM storage device prior to assignment of the classification to the data; and maintaining, by the VECD, storage of the data in the DRAM storage device when the data is assigned a classification that is higher in priority than the first classification.

Example 65 may include the method of examples 51-64 and/or some other examples herein, further comprising: determining, by the VECD, data access procedures to acquire raw data from each data source of the plurality of data sources; and determining, by the VECD, a sampling rate at which to access the raw data from each data source, and wherein the obtaining the data from the data source comprises obtaining the data according to the sampling rate determined for the data source from which the data is to be obtained.

Example 66 may include the method of example 65 and/or some other examples herein, wherein the first tier data store is three dimensional cross-point data storage device or a Peripheral Component Interconnect Express (PCIe) solid-state drive (SSD); and the second tier data store is a serial AT attachment (SATA) SSD or one or more hard disk drives.

Example 67 may include the method of example 66 and/or some other examples herein, wherein the plurality of data stores further comprises a third tier data store, and wherein the third tier data store is storage provided by a cloud computing service.

As will be appreciated by one skilled in the art, aspects of the present disclosure may be embodied as methods or computer program products. Accordingly, aspects of the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, aspects of the present disclosure may take the form of a computer program product embodied in any tangible or non-transitory medium of expression having computer-usable program code embodied in the medium.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

The invention claimed is:

1. A vehicle-embedded computer device (VECD) embedded in a vehicle, the VECD comprising:
   interface circuitry arranged to:
      obtain data from a data source of a plurality of data sources, wherein at least a subset of the data sources are disposed in the vehicle, and
      obtain state information related to one or more of at least one component of the VECD, at least one component of the vehicle, and at least one communications link;
   a classification engine coupled to the interface circuitry, the classification engine arranged to assign a classification to the obtained data according to the data source from which the data is obtained, a destination to which the obtained data is destined, and a vehicle context, wherein the vehicle context is based on the state information and one or both of environmental conditions related to the VECD and location information related to the VECD;
   a decision engine arranged to: determine, based on the classification and the vehicle context, at least one data store of a plurality of data stores in which to store the data, wherein the plurality of data stores are arranged in a hierarchy based on one or more of a cost of each data store, a durability of each data store, a read/write speed of each data store, and a size of each data store; and
   a data storage controller coupled to the interface circuitry, the data storage controller is arranged to store the obtained data in the determined data store.

2. The VECD of claim 1, wherein the plurality of data stores comprise a first tier data store disposed in the vehicle, a second tier data store disposed in the vehicle, and a third tier data store not disposed in the vehicle, and wherein the decision engine is arranged to:
   determine to store the data in the first tier data store when the data is assigned a first classification; and
   determine to store the data in the second tier data store when the data is assigned a second classification.

3. The VECD of claim 2, wherein the data is first data, the data source is a first data source, and wherein the classification engine is arranged to:
   assign the first classification to the first data based on a first target application associated with the first data, wherein the first target application has a first priority that is greater than priorities of other target applications; and
   assign the second classification to second data obtained from the first data source based on a second target application associated with the second data, wherein the second target application has a second priority that is lower than the first priority.

4. The VECD of claim 2, wherein the data is first data, the data source is a first data source, and wherein the classification engine is arranged to:
   assign the first classification to the first data based on a first processing requirement of the first data; and
   assign the second classification to second data obtained from the first data source based on a second processing requirement of the second data,
   wherein the first processing requirement includes generation of a first amount of metadata that is greater than a second amount of metadata generated according to the second processing requirement, and
   wherein the second data is obtained from the first data source or a second data source of the plurality of data sources.

5. The VECD of claim 2, wherein the classification engine is arranged to:
   assign the first classification to the data when an intended destination of the data is another VECD; and
   assign the second classification to the data when the intended destination of the data is a cloud computing service.

6. The VECD of claim 2, wherein the data is first data, the data source is a first data source, and wherein the classification engine is arranged to:
assign the first classification to the first data based on a first time delivery requirement of the first data; and
assign the second classification to second data based on a second time delivery requirement of the second data,
wherein the first time delivery requirement is a first amount of time that is less than a second amount of time of the second time delivery requirement.

7. The VECD of claim 2, wherein the state information further indicates a current state of the communications link based on communications link quality information obtained from communications circuitry coupled with the interface circuitry, and wherein:
the decision engine is arranged to identify the current state of the communications link; and
the data storage controller is arranged to control storage of the data in the second tier data store or the first tier data store regardless of a classification assigned to the data when the communications link quality information indicates that a quality of the communications link is below a predetermined threshold.

8. The VECD of claim 1, further comprising:
a hardware data processor arranged to process the data stored in the second tier data store or stored in the first tier data store when the data is associated with a time delivery requirement with an amount of time that is less than an amount of time of other time delivery requirements of other data.

9. The VECD of claim 2, wherein the VECD further comprises a dynamic random access memory (DRAM) storage device, and the data storage controller is further arranged to:
control storage of the obtained data in the DRAM storage device prior to the classification engine's assignment of the classification to the data; and
maintain storage of the data in the DRAM storage device when the data is assigned a classification that is higher in priority than the first classification.

10. The VECD of claim 1, further comprising:
a data acquisition engine arranged to determine data access procedures to acquire raw data from each data source of the plurality of data sources, and determine a sampling rate at which to access the raw data from each data source, and
the interface circuitry is arranged to obtain the data according to the sampling rate determined for the data source from which the data is to be obtained.

11. The VECD of claim 1, wherein:
the first tier data store is three dimensional cross-point data storage device or a Peripheral Component Interconnect Express (PCIe) solid-state drive (SSD);
the second tier data store is a serial AT attachment (SATA) SSD, one or more hard disk drives, or storage provided by a cloud computing service; and
the state information includes one or more of radio link strength information, radio link quality information, hardware workload information, memory utilization, processor utilization, processor time, local and remote storage availability, and information pertaining to utilized network resources.

12. One or more non-transitory computer-readable media (NTCRM), comprising instructions, wherein execution of the instructions by a vehicle-embedded computer device (VECD) is to cause the VECD is to:
obtain data from a data source of a plurality of data sources, wherein at least a subset of the data sources are disposed on a vehicle within which the VECD is embedded;
obtain state information related to one or more of at least one component of the VECD, at least one component of the vehicle, and at least one communications link;
assign a classification to the data according to the data source from which the data is obtained, a data consumer to which the obtained data is destined, and a vehicle context, wherein the vehicle context is based on the state information and one or both of environmental conditions related to the VECD and location information related to the VECD;
determine, based on the classification and the vehicle context, at least one data store of a plurality of data stores in which to store the data, wherein the plurality of data stores are arranged in a hierarchy based on one or more of a cost of each data store, a durability of each data store, a read/write speed of each data store, and a size of each data store; and
store the obtained in the determined data store.

13. The one or more NTCRM claim 12, wherein the plurality of data stores comprise a first tier data store and a second tier data store, and wherein execution of the instructions is to cause the VECD to:
determine to store the data in the first tier data store when the data is assigned a first classification; and
determine to store the data in the second tier data store when the data is assigned a second classification.

14. The one or more NTCRM of claim 13, wherein the data is first data, the data source is a first data source, and wherein execution of the instructions is to cause the VECD to:
assign the first classification to the first data based on a first target application associated with the first data, wherein the first target application has a first priority that is greater than priorities of other target applications; and
assign the second classification to second data obtained from the first data source based on a second target application associated with the second data, wherein the second target application has a second priority that is lower than the first priority.

15. The one or more NTCRM of claim 13, wherein the data is first data, the data source is a first data source, and wherein execution of the instructions is to cause the VECD to:
assign the first classification to the first data based on a first processing requirement of the first data; and
assign the second classification to second data obtained from the first data source based on a second processing requirement of the second data,
wherein the first processing requirement includes generation of a first amount of metadata that is greater than a second amount of metadata generated according to the second processing requirement, and wherein the second data is obtained from the first data source or a second data source of the plurality of data sources.

16. The one or more NTCRM of claim 13, wherein execution of the instructions is to cause the VECD to:
assign the first classification to the data when an intended destination of the data is another VECD; and
assign the second classification to the data when the intended destination of the data is a cloud computing service.

17. The one or more NTCRM of claim 13, wherein the data is first data, the data source is a first data source, and wherein execution of the instructions is to cause the VECD to:

assign the first classification to the first data based on a first time delivery requirement of the first data; and assign the second classification to second data based on a second time delivery requirement of the second data, wherein the first time delivery requirement is a first amount of time that is less than a second amount of time of the second time delivery requirement.

18. A method to be performed by a vehicle-embedded computer device (VECD), the method comprising:

obtaining, by the VECD, data from a data source of a plurality of data sources, wherein at least a subset of the data sources are disposed on a vehicle within which the VECD is embedded;

obtaining, by the VECD, state information related to one or more of at least one component of the VECD, at least one component of the vehicle, and at least one communications link;

assigning, by the VECD, a classification to the data according to the data source from which the data is obtained, a target application to which the obtained data is destined, a processing requirement of the data, an intended destination of the data, a time delivery requirement of the data, and a vehicle context wherein the vehicle context is based on the state information and one or both of environmental conditions related to the VECD and location information related to the VECD;

determining, by the VECD based on the classification and the vehicle context, at least one data store of a plurality of data stores disposed in the vehicle, in which to store the data, wherein the plurality of data stores are arranged in a hierarchy based on one or more of a cost of each data store, a durability of each data store, a read/write speed of each data store, and a size of each data store; and storing, by the VECD, the obtained data in the determined data store.

19. The method of claim 18, wherein the plurality of data stores comprise a first tier data store and a second tier data store, and the method further comprises:

determining, by the VECD, to store the data in the first tier data store when the data is assigned a first classification; and determining, by the VECD, to store the data in the second tier data store when the data is assigned a second classification.

20. An apparatus to be employed as a vehicle-embedded computer device (VECD), the apparatus comprising:

processor circuitry coupled with memory circuitry, the processor circuitry to execute instructions to:

operate a data acquisition engine to obtain data from a data source of a plurality of data sources, wherein at least a subset of the data sources are disposed on a vehicle within which the VECD is embedded;

operate a classification engine to assign a classification to the data according to the data source from which the data is obtained, a destination to which the obtained data is destined, and a vehicle context wherein the vehicle context is based on state information and one or both of environmental conditions related to the VECD and location information related to the VECD;

operate a decision engine to determine, based on the classification and the vehicle context, at least one data store of a plurality of data stores disposed in the vehicle in which to store the data, wherein the plurality of data stores are arranged in a hierarchy based on one or more of a cost of each data store, a durability of each data store, a read/write speed of each data store, and a size of each data store; and operate a data storage engine to store the data in the determined data store.

21. The apparatus of claim 20, wherein the plurality of data stores comprise a first tier data store and a second tier data store, and the processor circuitry is to operate the decision engine to:

determine to store the data in the first tier data store when the data is assigned a first classification; and determine to store the data in the second tier data store when the data is assigned a second classification.

22. The apparatus of claim 21, wherein the data is first data, the data source is a first data source, and the processor circuitry is to operate the classification engine to:

assign the first classification to the first data based on a first target application associated with the first data, wherein the first target application has a first priority that is greater than priorities of other target applications; and assign the second classification to second data obtained from the first data source based on a second target application associated with the second data, wherein the second target application has a second priority that is lower than the first priority.

23. The apparatus of claim 21, wherein the data is first data, the data source is a first data source, and the processor circuitry is to operate the classification engine to:

assign the first classification to the first data based on a first processing requirement of the first data; and assign the second classification to second data obtained from the first data source based on a second processing requirement of the second data, wherein the first processing requirement includes generation of a first amount of metadata that is greater than a second amount of metadata generated according to the second processing requirement, and wherein the second data is obtained from the first data source or a second data source of the plurality of data sources.

24. The apparatus of claim 21, wherein the processor circuitry is to operate the classification engine to:

assign the first classification to the data when an intended destination of the data is another VECD; and assign the second classification to the data when the intended destination of the data is a cloud computing service.

25. The apparatus of claim 21, wherein the data is first data, the data source is a first data source, and the processor circuitry is to operate the classification engine to:

assign the first classification to the first data based on a first time delivery requirement of the first data; and assign the second classification to second data based on a second time delivery requirement of the second data, wherein the first time delivery requirement is a first amount of time that is less than a second amount of time of the second time delivery requirement.

* * * * *